No. 866,176. PATENTED SEPT. 17, 1907.
F. AINSWORTH.
ARTIFICIAL DENTURE.
APPLICATION FILED MAY 3, 1906.
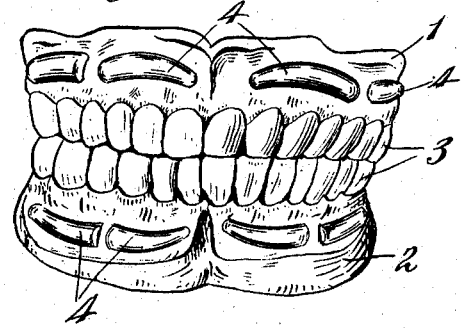
Witnesses:
Eugene M Sliney
C C Cousins
Francis Ainsworth,
Inventor,
By Marion & Marion
Attorneys

UNITED STATES PATENT OFFICE.

FRANCIS AINSWORTH, OF ST. JOHN, NEW BRUNSWICK, CANADA.

ARTIFICIAL DENTURE.

No. 866,176.  Specification of Letters Patent.  Patented Sept. 17, 1907.

Application filed May 3, 1906. Serial No. 314,918.

*To all whom it may concern:*

Be it known that I, FRANCIS AINSWORTH, a subject of the King of Great Britain, residing at St. John, in the Province of New Brunswick, Canada, have invented certain new and useful Improvements in Artificial Dentures; and I do hereby declare that the following is a full, clear, and exact description of the invention, such as will enable others skilled in the art to which it appertains to make and use the same.

My invention relates to artificial denture; the object of my invention is to provide on a plate carrying artificial teeth means for changing the contour of the lips and cheeks of the wearer; a more specific object is to provide means for maintaining the contour of the lips and teeth without the use of a heavy built-up plate; and, my invention consists of placing on a dental plate a plurality of easily removable shells filled with an adhesive which is adapted to harden so as to fix the shells to the plate, and also to preserve the contour of the shells.

In the accompanying drawings, forming part of this application, I have illustrated one form of embodiment of my invention, in which drawings similar reference characters designate corresponding parts, and in which:

Figure 1 is a front elevation of an upper and lower set of artificial teeth, showing the application of my invention; Fig. 2 is a bottom plan view of one of the shells; Fig. 3 is a transverse vertical section through one of the shells; Fig. 4 is a transverse vertical section through one of the shells and a portion of the plate, illustrating the method of attaching; Fig. 5 is a side elevation of a modified form of shell; and, Fig. 6 is a side elevation of a still further modified form, which modification applies to the plurality of channels formed in the shell.

Referring to the drawings, 1 designates an upper and 2 a lower dental plate, having thereon artificial teeth 3.

For the purpose of filling out the lips and cheeks, there is disposed on the plates a plurality of shells 4, formed from aluminium or other suitable material. I prefer to use aluminium because of its pliability, and further because it is more easily cut so as to secure the proper size.

For the purpose of cutting the shells, they may be provided with a plurality of longitudinal channels 5. These channels also serve as a means for attaching the shell to the plate, as best shown in Fig. 4, the cement 6 filling the interior of the shell, and also engaging in the channels 5.

The filling 6 of cement may be softened by the application of heat, and the shell applied to the plate, and when the cement cools the shells are firmly fixed in position. The excess of cement adhering to the sides of the shell may be removed with any suitable instrument.

By forming the shells 4 of a pliable metal which is easily cut, the desired contour may be readily secured by bending or cutting the shell. The filling 6 of cement, after hardening within the shells, will effectually maintain the shell in whatever form it may be pressed.

For the purpose of securing the desired height of the attachment, a plurality of the shells 4 may be superposed one upon the other, a suitable filling of cement being placed between each shell.

Having thus fully described my invention, what I claim as new and desire to secure by Letters Patent, is:—

1. A device of the character described comprising a hollow metallic shell adapted to be attached to the outer side of a dental plate, and provided with a longitudinal recess therein adapted to receive cement by which said device is secured in position.

2. A device of the character described comprising a hollow metallic shell adapted to be attached to the outer side of a dental plate, a longitudinal recess therein, and a cement filling within said device and projecting into the aforesaid recesses, whereby said device is held in place.

3. A device of the character described comprising a plurality of hollow metallic shells adapted to be nested one upon the other, longitudinal recesses in said shells, and a cement filling interposed between the successive shells and projecting into the recesses therein, thereby fastening said shells in place.

In witness whereof I have hereunto set my hand in the presence of two witnesses.

FRANCIS AINSWORTH.

Witnesses:
HENRY FINIGAN,
MICHAEL B. MCCORMICK.